US010730544B2

(12) United States Patent
Heon et al.

(10) Patent No.: US 10,730,544 B2
(45) Date of Patent: Aug. 4, 2020

(54) RACK AND PINION STEERING SYSTEM

(71) Applicant: BOMBARDIER RECREATIONAL PRODUCTS INC., Valcourt (CA)

(72) Inventors: Martin Heon, Sherbrooke (CA); Charles Despres-Nadeau, Sherbrooke (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 0 days.

(21) Appl. No.: 16/571,617

(22) Filed: Sep. 16, 2019

(65) Prior Publication Data

US 2020/0010108 A1    Jan. 9, 2020

Related U.S. Application Data

(63) Continuation of application No. 15/142,454, filed on Apr. 29, 2016, now Pat. No. 10,442,458, which is a (Continued)

(51) Int. Cl.
*B62D 3/12* (2006.01)
*B60G 3/20* (2006.01)
(Continued)

(52) U.S. Cl.
CPC ............... *B62D 3/12* (2013.01); *B60G 3/20* (2013.01); *B60G 13/001* (2013.01);
(Continued)

(58) Field of Classification Search
CPC . B62D 3/12; B62D 3/126; B62D 7/16; B62D 7/20; B60G 3/20; B60G 3/202; B60G 3/205; B60G 21/055; B60G 2200/1442
See application file for complete search history.

(56) References Cited

U.S. PATENT DOCUMENTS 3,124,006 A    3/1964 Parker
3,642,084 A    2/1972 Takahashi
(Continued)

FOREIGN PATENT DOCUMENTS

WO    2015114606 A1    8/2015

OTHER PUBLICATIONS

International Search Report of PCT/IB2016/054894; Blaine R. Copenheaver; dated Dec. 20, 2016.

*Primary Examiner* — Barry Gooden, Jr.
(74) *Attorney, Agent, or Firm* — BCF LLP

(57) ABSTRACT

A vehicle has a frame, a motor, a driveshaft operatively connected to the motor, a front differential operatively connected to the driveshaft, a pair of front half-shafts operatively connecting the front differential to front wheels, at least one rear wheel, a steering wheel, a steering column operatively connected to the steering wheel, a rack and pinion assembly operatively connected to the steering column, the rack and pinion assembly being disposed rearward of the front differential, a right tie rod having a left end operatively connected to a rack of the rack and pinion assembly and a right end operatively connected to the right wheel, and a left tie rod having a right end operatively connected to the rack and a left end operatively connected to the left wheel. The inner ends of the tie rods are disposed forwardly of a vertically and laterally extending central plane of the rack.

20 Claims, 11 Drawing Sheets

Related U.S. Application Data continuation-in-part of application No. 15/010,773, filed on Jan. 29, 2016, now Pat. No. 9,981,519.

(60) Provisional application No. 62/109,375, filed on Jan. 29, 2015, provisional application No. 62/155,046, filed on Apr. 30, 2015.

(51) Int. Cl.
| | |
|---|---|
| *B62D 7/20* | (2006.01) |
| *B62D 5/04* | (2006.01) |
| *B62D 7/16* | (2006.01) |
| *B60G 13/00* | (2006.01) |
| *B62D 23/00* | (2006.01) |
| *F16H 37/02* | (2006.01) |
| *F16H 37/08* | (2006.01) |
| *F16H 57/04* | (2010.01) |
| *F16H 57/035* | (2012.01) |
| *B60K 17/34* | (2006.01) |

(52) U.S. Cl.
CPC ........... *B62D 5/0409* (2013.01); *B62D 7/163* (2013.01); *B60G 2200/14* (2013.01); *B60G 2200/144* (2013.01); *B60G 2200/44* (2013.01); *B60G 2300/07* (2013.01); *B60G 2300/13* (2013.01); *B60K 17/34* (2013.01); *B62D 23/005* (2013.01); *F16H 37/021* (2013.01); *F16H 37/0813* (2013.01); *F16H 57/035* (2013.01); *F16H 57/0416* (2013.01)

(56) References Cited

U.S. PATENT DOCUMENTS

| | | | |
|---|---|---|---|
| 3,801,125 A | 4/1974 | Gotzenberger | |
| 4,028,957 A | 6/1977 | Wright | |
| 4,428,450 A | 1/1984 | Stenstrom et al. | |
| 4,479,400 A | 10/1984 | Rieger | |
| 4,709,591 A | 12/1987 | Emori et al. | |
| 4,811,813 A | 3/1989 | Hovanchak | |
| 4,819,499 A | 4/1989 | Morell | |
| 4,842,298 A | 6/1989 | Jarvis | |
| 4,865,149 A | 9/1989 | Rohrbach et al. | |
| 5,065,831 A | 11/1991 | Murakami | |
| 5,327,989 A * | 7/1994 | Furuhashi | B60G 3/20 180/248 |
| 5,613,572 A | 3/1997 | Moedinger | |
| 5,630,623 A | 5/1997 | Ganzel | |
| 6,070,891 A | 6/2000 | Knautz et al. | |
| 6,361,074 B1 | 3/2002 | Nonaka et al. | |
| 6,408,976 B1 | 6/2002 | Saito et al. | |
| 6,431,569 B2 | 8/2002 | Handa | |
| 6,695,329 B2 | 2/2004 | Handa | |
| 7,832,521 B2 * | 11/2010 | Levell | B62D 9/002 180/364 |
| 8,454,041 B2 * | 6/2013 | Fujii | B60G 3/20 280/124.125 |
| 8,746,719 B2 | 6/2014 | Safranski et al. | |
| 8,764,040 B1 | 7/2014 | Delauter | |
| 9,211,924 B2 | 12/2015 | Safranski et al. | |
| 9,283,985 B2 | 3/2016 | Schroeder et al. | |
| 9,365,251 B2 | 6/2016 | Safranski et al. | |
| 9,434,244 B2 | 9/2016 | Sunsdahl et al. | |
| 9,539,871 B2 | 1/2017 | Suzuki et al. | |
| 9,889,736 B2 | 2/2018 | Yamada et al. | |
| 9,895,946 B2 | 2/2018 | Schlangen et al. | |
| 9,981,519 B2 | 5/2018 | Despres-Nadeau et al. | |
| 2002/0027036 A1 | 3/2002 | Hori et al. | |
| 2004/0195019 A1 | 10/2004 | Kato et al. | |
| 2004/0195028 A1 | 10/2004 | Izumi | |
| 2004/0231900 A1 | 11/2004 | Tanaka et al. | |
| 2006/0043690 A1 | 3/2006 | Pankau | |
| 2006/0113739 A1 | 6/2006 | Spetz et al. | |
| 2008/0128194 A1 | 6/2008 | Levell et al. | |
| 2008/0179128 A1 | 7/2008 | Iwaki et al. | |
| 2008/0290623 A1 | 11/2008 | Lundmark | |
| 2009/0066046 A1 | 3/2009 | Takemura et al. | |
| 2009/0133950 A1 | 5/2009 | Takemura et al. | |
| 2011/0048833 A1 | 3/2011 | Schapf et al. | |
| 2012/0018973 A1 | 1/2012 | Fujii et al. | |
| 2012/0031688 A1 | 2/2012 | Safranski et al. | |
| 2012/0031693 A1 | 2/2012 | Deckard et al. | |
| 2012/0223500 A1 | 9/2012 | Kinsman et al. | |
| 2013/0113173 A1 | 5/2013 | Bilmayer et al. | |
| 2013/0186703 A1 | 7/2013 | Kim | |
| 2013/0277937 A1 | 10/2013 | Keller et al. | |
| 2014/0124279 A1 | 5/2014 | Schlangen et al. | |
| 2014/0225357 A1 | 8/2014 | Shinbori | |
| 2014/0251712 A1 | 9/2014 | Brady et al. | |
| 2015/0061275 A1 | 3/2015 | Deckard et al. | |
| 2015/0197273 A1 | 7/2015 | Schroeder et al. | |
| 2016/0185390 A1 | 6/2016 | Suzuki et al. | |
| 2016/0347137 A1 | 12/2016 | Despres-Nadeau et al. | |
| 2019/0291521 A1 * | 9/2019 | Sawai | B60G 7/001 |
| 2019/0299734 A1 * | 10/2019 | Hisamura | B60G 3/04 |

\* cited by examiner

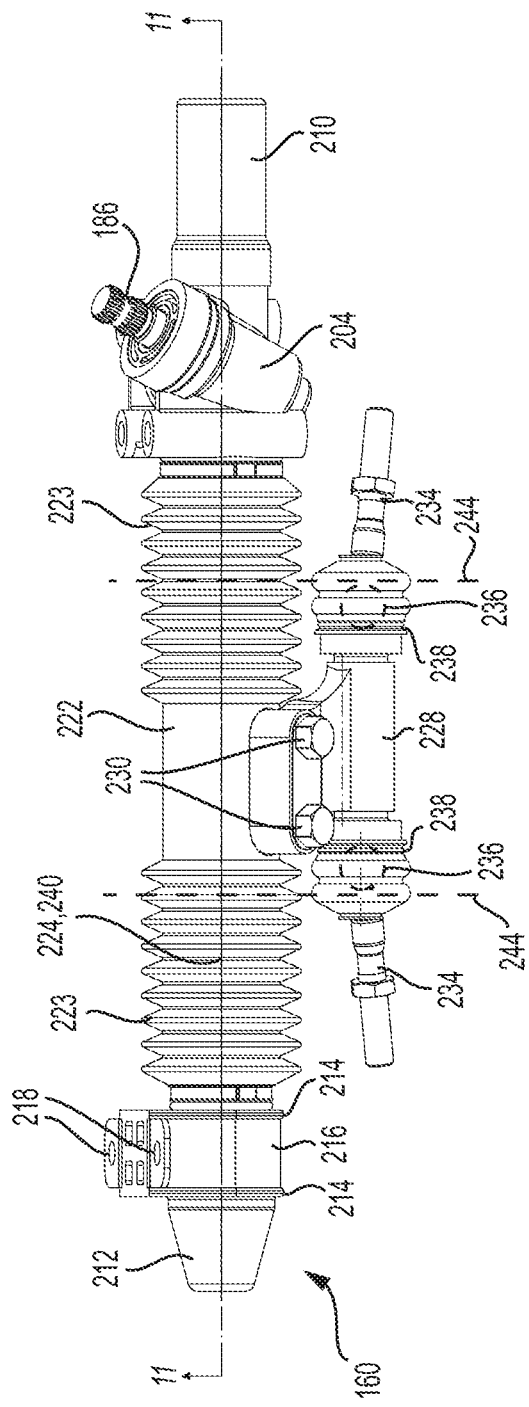
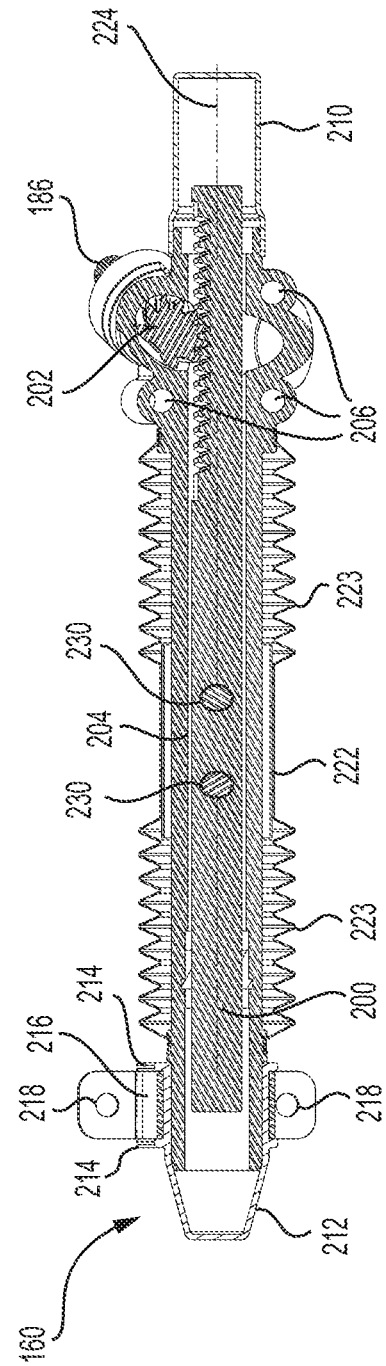
FIG. 10
FIG. 11

RACK AND PINION STEERING SYSTEM

CROSS-REFERENCE

The present application is a continuation of U.S. patent application Ser. No. 15/142,454, filed Apr. 29, 2016. U.S. patent application Ser. No. 15/142,454 claims priority to U.S. Provisional Patent Application No. 62/155,046, filed Apr. 30, 2015 and is a continuation-in-part of U.S. patent application Ser. No. 15/010,773, filed Jan. 29, 2016. Through U.S. patent application Ser. No. 15/010,773, the present application claims priority to U.S. Provisional Patent Application No. 62/109,375, filed Jan. 29, 2015. The entirety of these three applications is incorporated herein by reference.

FIELD OF TECHNOLOGY

The present technology relates to rack and pinion steering systems for vehicles.

BACKGROUND

There exist various types of vehicles used mainly in off-road conditions. One such type is the side-by-side off-road vehicle. The name "side-by-side" refers to the seating arrangement of the vehicle in which the driver and a passenger are seated side-by-side. Some side-by-side off-road vehicles also have a second row of seats to accommodate one or more additional passengers. These vehicles typically have an open cockpit, a roll cage and a steering wheel.

To be able to operate in off-road conditions, a side-by-side off-road vehicle needs to be able to handle bumpy terrain to operate on various surfaces including, but not limited to, sand, dirt and mud. These conditions represent unique challenges not typically encountered when designing on-road vehicles such as cars. One such challenge is that the amount of travel of the suspension systems is generally greater than in on-road vehicles such as cars in order to handle the bumpy terrain.

Furthermore, side-by-side off-road vehicles are generally narrower and shorter than on-road vehicles such as cars. As such, there is less room for all the vehicle's components such as the steering system. In the steering system, having a long steering column increases the chance that the steering shaft will interfere with other components such as the suspension.

One solution used to accommodate the steering system consists in having a steering column made of multiple shafts connected to each other by articulations such as universal joints. However, having a lot of articulations usually results in more angle changes between the steering wheel and the rack and pinion assembly used in some vehicles due to play in the articulations. Therefore, the rack of the rack and pinion assembly moves less than it should for the amount by which the steering wheel is turned. Also, as the number of articulations increases, the force required to rotate the steering wheel also increases.

Furthermore, the tie rods connecting the rack of the rack and pinion assembly to the wheels are connected to the ends of the rack. While this helps prevent any contact between the tie rods and the rack and pinion assembly as the tie rods pivot with the travel of the wheels, the resulting tie rods are relatively short. Having short tie rods causes bump-steer as the wheels travel from their normal rest positions. Although the amount of bump-steer is minimal for a small amount of travel, this amount increases as the wheels travel more and becomes unacceptable beyond a certain amount of wheel travel. As such, the design of the front suspension assemblies has to be a trade-off between the amount of travel of the wheels and the amount of bump-steer resulting from the short tie rods.

Therefore, there is a desire for a steering system that has few articulations, is unlikely to cause interference with other components of the vehicle and permits large amounts of travel of the front wheels.

SUMMARY

The present technology addresses at least one of the deficiencies of the prior art mentioned above.

According to one aspect of the present technology, there is provided a vehicle having a frame, a motor supported by the frame, a driveshaft operatively connected to the motor, a front differential operatively connected to the driveshaft, a front right half-shaft having a left end operatively connected to the front differential, a front right wheel operatively connected to a right end of the front right half-shaft, a front left half-shaft having a right end operatively connected to the front differential, a front left wheel operatively connected to a left end of the front left half-shaft, at least one rear wheel supported by the frame, a steering wheel supported by the frame, a lower right A-arm being pivotally connected to the frame about a right lower pivot axis, an upper right A-arm being pivotally connected to the frame about a right upper pivot axis, a lower left A-arm being pivotally connected to the frame about a left lower pivot axis, an upper left A-arm being pivotally connected to the frame about a left upper pivot axis, a steering column operatively connected to the steering wheel, a rack and pinion assembly operatively connected to the steering column, the rack and pinion assembly being disposed rearward of the front differential, a right tie rod having a left end operatively connected to a rack of the rack and pinion assembly and a right end operatively connected to the right wheel, and a left tie rod having a right end operatively connected to the rack and a left end operatively connected to the left wheel. The left end of the right tie rod and the right end of the left tie rod are disposed forwardly of a vertically and laterally extending central plane of the rack. When the steering wheel is steered in a position corresponding to the vehicle being steered in a straight ahead position: a connection of the left end of the right tie rod to the rack and a connection of the right end of the left tie rod to the rack are disposed laterally between the right upper pivot axis and the left upper pivot axis; and the right lower pivot axis and the left lower pivot axis are disposed laterally between the connection of the left end of the right tie rod to the rack and the connection of the right end of the left tie rod to the rack.

According to some implementations of the present technology, a right knuckle is operatively connected to the right wheel. The right end of the right tie rod is operatively connected to the right knuckle. The lower right A-arm operatively connects the right knuckle to the frame. The upper right A-arm operatively connects the right knuckle to the frame. A right shock absorber is operatively connected between the frame and one of the lower right A-arm and the upper right A-arm. The right shock absorber is pivotally connected to the frame about a right shock absorber axis. A left knuckle operatively connects to the left wheel. The left end of the left tie rod is operatively connected to the left knuckle. The lower left A-arm operatively connects the left knuckle to the frame. The upper left A-arm operatively connects the left knuckle to the frame. A left shock absorber is operatively connected between the frame and one of the lower left A-arm and the upper left A-arm. The left shock absorber is pivotally connected to the frame about a left shock absorber axis.

According to some implementations of the present technology, the right shock absorber has a right shock absorber axis. The left shock absorber has a left shock absorber axis. The rack and pinion assembly is disposed rearward of a plane containing the right and left shock absorber axes.

According to some implementations of the present technology, the left end of the right tie rod and the right end of the left tie rod are disposed rearward of the plane containing the right and left shock absorber axes.

According to some implementations of the present technology, at least a portion of the rack and pinion assembly is disposed vertically between a top plane and a bottom plane. The top plane contains the right and left upper pivot axes. The bottom plane contains the right and left lower pivot axes.

According to some implementations of the present technology, a sway bar has a right end operatively connected to the upper right A-arm, a left end operatively connected to the upper left A-arm and a laterally extending central portion. The laterally extending central portion of the sway bar extends above the rack and pinion assembly.

According to some implementations of the present technology, the lower right A-arm has a front arm and a rear arm. The lower left A-arm has a front arm and a rear arm. The rack and pinion assembly is disposed forwardly of inner ends of the rear arms of the lower right and left A-arms.

According to some implementations of the present technology, the driveshaft extends under the rack and pinion assembly.

According to some implementations of the present technology, a connection between the steering column and a pinion of the rack and pinion assembly is disposed on a left side of a longitudinal centerline of the vehicle.

According to some implementations of the present technology, the lower right A-arm has a front arm and a rear arm. The lower left A-arm has a front arm and a rear arm. The upper right A-arm has a front arm and a rear arm. The upper left A-arm has a front arm and a rear arm. Inner ends of the rear arms of the lower right and left A-arms are disposed rearward of inner ends of the rear arms of the upper right and left A-arms.

According to one aspect of the present technology, the there is provided a vehicle having a frame, a motor supported by the frame, a driveshaft operatively connected to the motor, a front differential operatively connected to the driveshaft, a front right half-shaft having a left end operatively connected to the front differential, a front right wheel operatively connected to a right end of the front right half-shaft, a front left half-shaft having a right end operatively connected to the front differential, a front left wheel operatively connected to a left end of the front left half-shaft, at least one rear wheel supported by the frame, a steering wheel supported by the frame, a lower right A-arm being pivotally connected to the frame about a right lower pivot axis, an upper right A-arm being pivotally connected to the frame about a right upper pivot axis, a lower left A-arm being pivotally connected to the frame about a left lower pivot axis, an upper left A-arm being pivotally connected to the frame about a left upper pivot axis, a steering column operatively connected to the steering wheel, a rack and pinion assembly operatively connected to the steering column, the rack and pinion assembly being disposed rearward of the front differential, a right tie rod having a left end operatively connected to a rack of the rack and pinion assembly and a right end operatively connected to the right wheel, and a left tie rod having a right end operatively connected to the rack and a left end operatively connected to the left wheel. The left end of the right tie rod and the right end of the left tie rod are disposed forwardly of a vertically and laterally extending central plane of the rack. The right lower pivot axis and the left lower pivot axis are disposed laterally between a right vertical plane and a left vertical plane. The right vertical plane contains a right end of the front differential. The left vertical plane contains a left end of the front differential. The right lower pivot axis and the left lower pivot axis are disposed laterally between the right upper pivot axis and the left upper pivot axis.

According to some implementations of the present technology, a right knuckle is operatively connected to the right wheel. The right end of the right tie rod is operatively connected to the right knuckle. The lower right A-arm operatively connects the right knuckle to the frame. The upper right A-arm operatively connects the right knuckle to the frame. A right shock absorber is operatively connected between the frame and one of the lower right A-arm and the upper right A-arm. The right shock absorber is pivotally connected to the frame about a right shock absorber axis. A left knuckle operatively connects to the left wheel. The left end of the left tie rod is operatively connected to the left knuckle. The lower left A-arm operatively connects the left knuckle to the frame. The upper left A-arm operatively connects the left knuckle to the frame. A left shock absorber is operatively connected between the frame and one of the lower left A-arm and the upper left A-arm. The left shock absorber is pivotally connected to the frame about a left shock absorber axis.

According to some implementations of the present technology, the right shock absorber has a right shock absorber axis. The left shock absorber has a left shock absorber axis. The rack and pinion assembly is disposed rearward of a plane containing the right and left shock absorber axes.

According to some implementations of the present technology, the left end of the right tie rod and the right end of the left tie rod are disposed rearward of the plane containing the right and left shock absorber axes.

According to some implementations of the present technology, at least a portion of the rack and pinion assembly is disposed vertically between a top plane and a bottom plane. The top plane contains the right and left upper pivot axes. The bottom plane contains the right and left lower pivot axes.

According to some implementations of the present technology, a sway bar has a right end operatively connected to the upper right A-arm, a left end operatively connected to the upper left A-arm and a laterally extending central portion. The laterally extending central portion of the sway bar extends above the rack and pinion assembly.

According to some implementations of the present technology, the lower right A-arm has a front arm and a rear arm. The lower left A-arm has a front arm and a rear arm. The rack and pinion assembly is disposed forwardly of inner ends of the rear arms of the lower right and left A-arms.

According to some implementations of the present technology, the driveshaft extends under the rack and pinion assembly.

According to some implementations of the present technology, a connection between the steering column and a pinion of the rack and pinion assembly is disposed on a left side of a longitudinal centerline of the vehicle.

According to some implementations of the present technology, the lower right A-arm has a front arm and a rear arm. The lower left A-arm has a front arm and a rear arm. The upper right A-arm has a front arm and a rear arm. The upper left A-arm has a front arm and a rear arm. Inner ends of the rear arms of the lower right and left A-arms are disposed rearward of inner ends of the rear arms of the upper right and left A-arms.

For purposes of this application, terms related to spatial orientation such as forwardly, rearward, upwardly, downwardly, left, and right, are as they would normally be understood by a driver of the vehicle sitting thereon in a normal riding position. Terms related to spatial orientation when describing or referring to components or sub-assemblies of the vehicle, separately from the vehicle should be understood as they would be understood when these components or sub-assemblies are mounted to the vehicle, unless specified otherwise in this application.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where:

FIG. 10 is a top plan view of the rack and pinion assembly of the steering assembly of the vehicle of FIG. 1 illustrating a connection between tie rods of the steering system and the rack and pinion assembly;

FIG. 11 is a cross-sectional view of the components of FIG. 10 taken through line 11-11 of FIG. 10.

DETAILED DESCRIPTION

Figure 1:
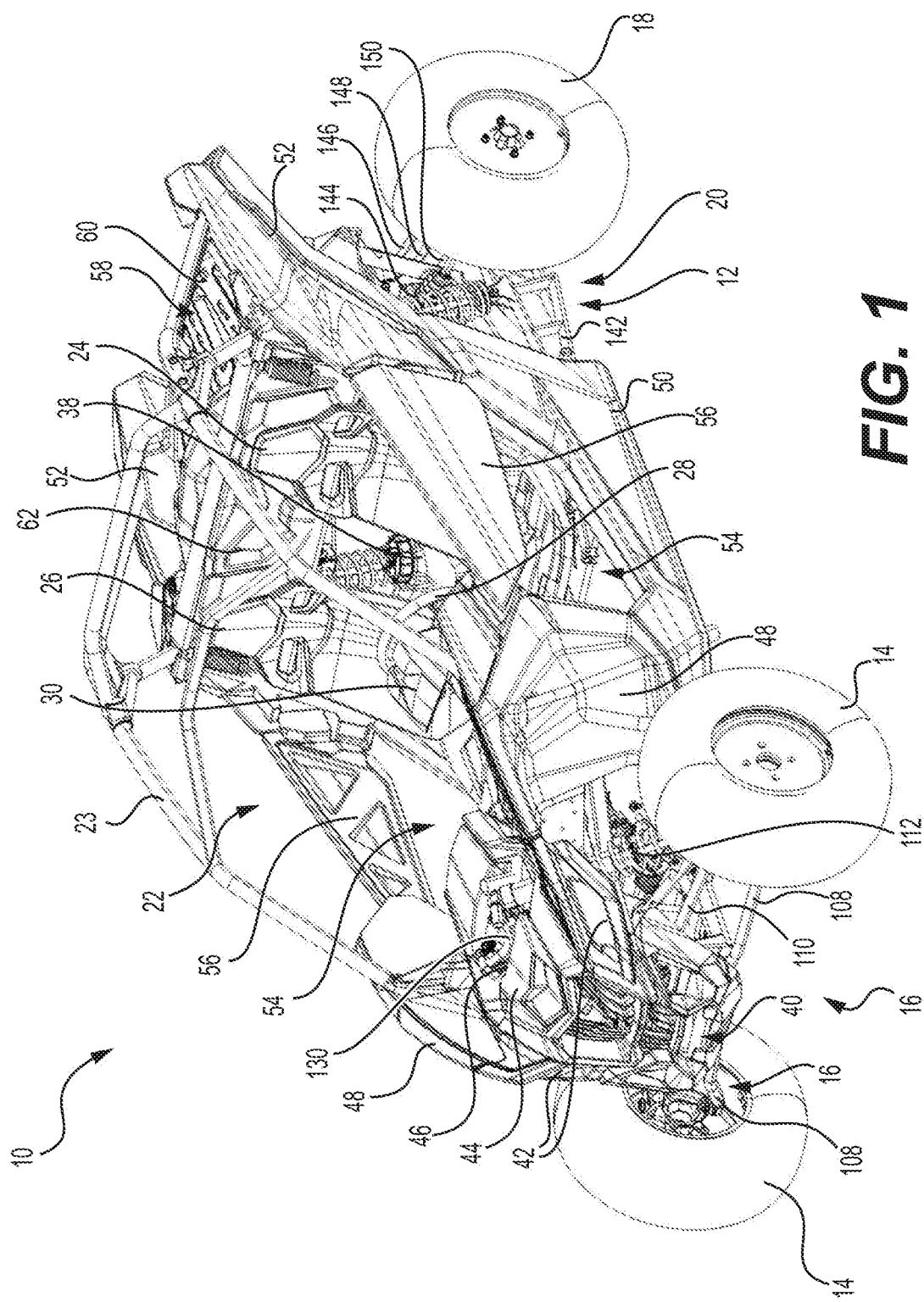
FIG. 1 is a perspective view of an off-road vehicle taken from a front, left side.

The present technology will be described with respect to a four-wheel, off-road vehicle 10 having two side-by-side seats and a steering wheel. However, it is contemplated that some aspects of the present technology may apply to other types of vehicles such as, but not limited to, off-road vehicles having a handlebar and a straddle seat (i.e. an all-terrain vehicle (ATV)), off-road vehicles having more or less than four wheels, and on-road vehicles.

The general features of the off-road vehicle 10 will be described with respect to FIGS. 1 to 4. The vehicle 10 has a frame 12, two front wheels 14 connected to a front of the frame 12 by front suspension assemblies 16 and two rear wheels 18 connected to the frame 12 by rear suspension assemblies 20.

The frame 12 defines a central cockpit area 22 inside which are disposed a driver seat 24 and a passenger seat 26. The frame 12 also defines a roll cage 23 disposed over the cockpit area 22. In the present implementation, the driver seat 24 is disposed on the left side of the vehicle 10 and the passenger seat 26 is disposed on the right side of the vehicle 10. However, it is contemplated that the driver seat 24 could be disposed on the right side of the vehicle 10 and that the passenger seat 26 could be disposed on the left side of the vehicle 10. A steering wheel 28 is disposed in front of the driver seat 24. The steering wheel 28 is used to turn the front wheels 14 to steer the vehicle 10 as will be described in greater detail below. Various displays and gauges 30 are disposed above the steering wheel 28 to provide information to the driver regarding the operating conditions of the vehicle 10. Examples of displays and gauges 30 include, but are not limited to, a speedometer, a tachometer, a fuel gauge, a transmission position display, and an oil temperature gauge.

Figure 2:
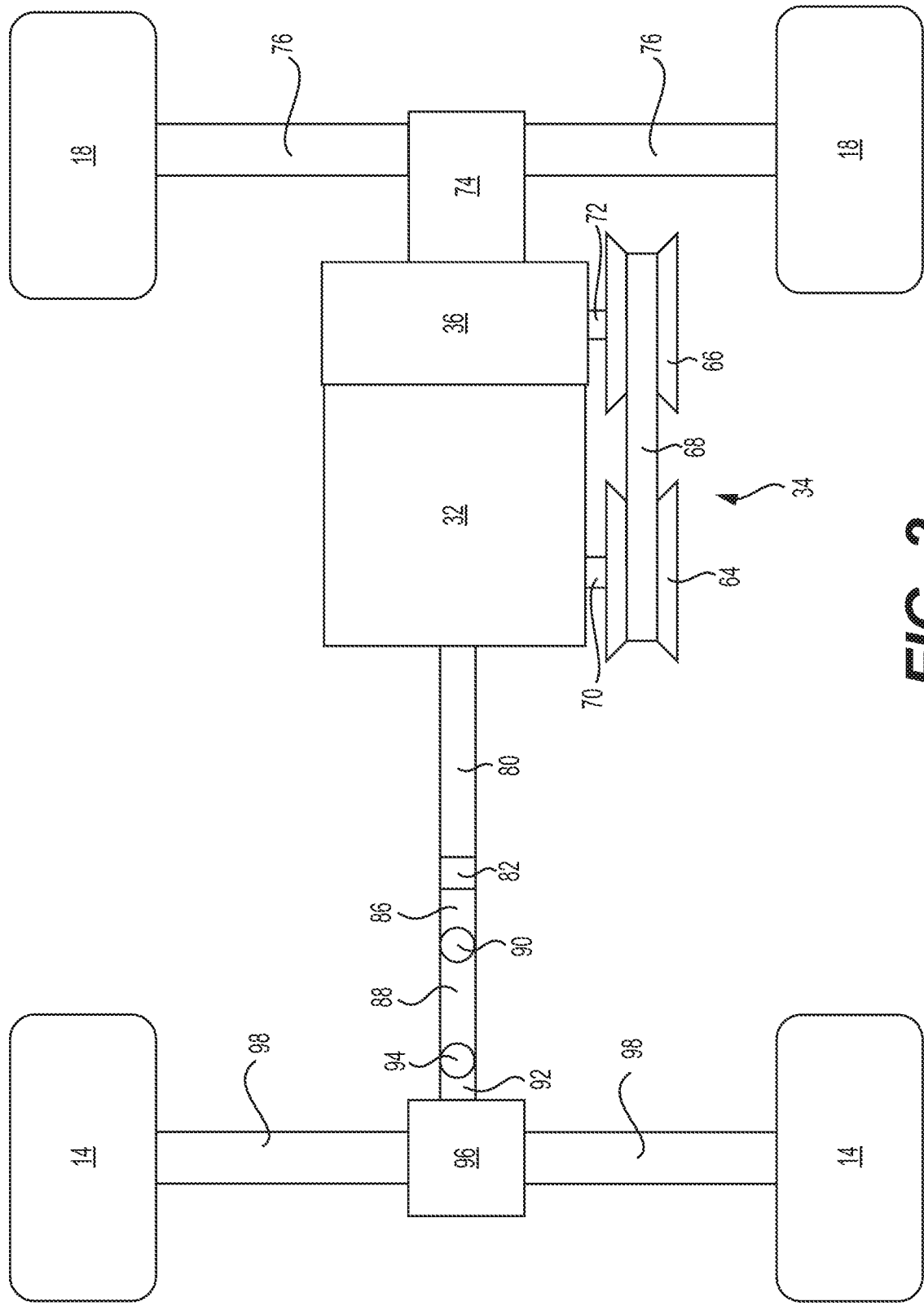
FIG. 2 is a schematic illustration of a power train of the vehicle of FIG. 1.

An engine 32 (FIG. 2) is connected to the frame 12 behind the seats 24, 26. As can be seen in FIG. 2, the engine 32 is connected to a continuously variable transmission (CVT) 34 disposed on a left side of the engine 32. The CVT 34 is operatively connected to a geared transmission 36 to transmit torque from the engine 32 to the transmission 36. The transmission 36 is disposed behind the engine 32. The transmission 36 is operatively connected to the front and rear wheels 14, 18 to propel the vehicle 10. A power train of the vehicle 10 will be described in greater detail below. A fuel tank 38 is disposed in front of the engine 32. The fuel tank 38 is disposed in part behind the seats 24, 26 and in part between the seats 24, 26.

Turning back to FIG. 1, body panels of the vehicle 10 will be described. The body panels are connected to the frame 12. The panels help protect the internal components of the vehicle 10 and provide some of the aesthetic features of the vehicle 10. Front panels 40 are connected to a front of the frame 12. The front panels 40 are disposed forward of the front suspension assemblies 16 and laterally between the front wheels 14. The front panels 40 define two apertures inside which the headlights 42 of the vehicle 10 are disposed. A cover 44 extends generally horizontally reward from a top of the front panels 40. The cover 44 defines an aperture 46 through which tops of the front suspension assemblies 16 protrude as will be described in greater detail below. Front fenders 48 are disposed rearward of the front panels 40 on each side of the vehicle 10. Each front fender 48 is disposed in part above and in part behind of its corresponding front wheel 14. Lower panels 50 extend along the bottom of the frame 12 between the front and rear wheels 14, 18. Each lower panel 50 has a front end disposed under the bottom portion of its corresponding front fender 48 and extends rearward therefrom. The rear end of each lower panel 50 extends upward such that each lower panel 50 is generally L-shaped. Generally L-shaped rear fenders 52 extend upward and then rearward from the rear, upper ends of the lower panels 50. Each rear fender 52 is disposed in part above and in part forward of its corresponding rear wheel 18.

On each side of the vehicle 10, the front fender 48, the lower panel 50 and the rear fender 52 define a passage 54 through which a driver (or passenger depending on the side of the vehicle 10) can enter or exit the vehicle 10. Each side of the vehicle 10 is provided with a door 56 that selectively closes an upper portion of the corresponding passage 54. Each door 56 is hinged at a rear thereof to its corresponding rear fender 52 and selectively connected at a front thereof to its corresponding front fender 48 via a releasable latch (not shown). It is contemplated that each door 56 could be hinged at a front thereof and latched at a rear thereof. When the doors 56 are closed, the lower portions of the passages 54 are still opened. It is contemplated that nets could extend in the lower portions of the passages 54 when the doors 56 are closed or that the doors 56 could be larger so as to close the lower portions of the passages 54.

As best seen in FIG. 1, the rear fenders 52 define a cargo space 58 therebetween behind the seats 24, 26. The cargo space 58 has a floor 60 extending horizontally between the rear fenders 52. The floor 60 has a plurality of apertures such that the floor 60 can act as an attachments base to receive anchors such as those described in U.S. Pat. No. 8,875,830, issued Nov. 4, 2014, the entirety of which is incorporated herein by reference, in order to secure various items in the cargo space 58. It is contemplated that hooks and/or loops could be provided instead of or in addition to the apertures in the floor 60. It is also contemplated that the floor 60 could not be provided with any attachment features. It is contemplated that the floor 60 could be replaced by a cargo box that can be tilted in order to dump its content. A separation panel 62 extends laterally and is disposed longitudinally between the seats 24, 26 and the floor 60. As a result, the separation panel 62 separates the cockpit area 22 from the cargo area 58. The separation panel 62 is higher than the top of the seats 24, 26.

Rear panels (not shown) extend generally horizontally downward from the rear end of the floor 60. The rear panels are disposed laterally between the rear wheels 18. The rear panels define apertures to receive the brake lights (not shown) of the vehicle 10. It is contemplated that the brake lights could be replaced with reflectors or that reflectors could be provided in addition to the brake lights. Engine compartment walls (not shown) extend forward of each lateral end of the rear panels below the floor. Each engine compartment wall is disposed laterally between one side of the engine 32 and a corresponding rear wheel 18. The engine compartment walls, the rear panels and the floor 60 together define a portion of an engine compartment containing the engine 32, the CVT 34 and the transmission 36.

Turning now to FIG. 2, the power train of the vehicle 10 will be described. As previously mentioned, the engine 32 is connected to the frame 12 behind the seats 24, 26. In the present implementation, the engine 32 is an in-line, three-cylinder, four-stroke internal combustion engine. It is contemplated that other types of internal combustion engines could be use, such as a V-twin, two-stroke internal combustion engine for example. It is also contemplated that in some implementations, the engine 32 could be replaced by another type of motor such as a diesel engine or an electric motor for example.

The transmission 36 is mounted to the back of the engine 32. The transmission 36 is mechanically connected to a shifter (not shown). The shifter is disposed laterally between the two seats 24, 26. The shifter allows the driver to select from a plurality of combinations of engagement of gears of the transmission 36, commonly referred to as gears. In the present implementation, the shifter allows the driver to select between a reverse gear, two forward gears (high and low) and a neutral position in which the transmission 36 does not transmit torque to the wheels 14, 18. It is contemplated that other types of connections between the shifter and the transmission 36 could be used. It is also contemplated that the transmission 36 could select between transferring torque to only the rear wheels 18 and all four wheels 14, 18, in which case a two-wheel drive, four-wheel drive selector would be provided in the vicinity of the driver.

The CVT 34 is mounted on the left side of the engine 32 and of the transmission 36. The CVT 34 has a CVT housing (not shown) inside which are located a driving pulley 64, a driven pulley 66 and a belt 68. In order to cool the CVT 34, the CVT housing is provided with inlet pipes (not shown) to supply air inside the CVT housing and outlet pipes (not shown) to exhaust air from the CVT housing. The driving pulley 64 is mounted on and driven by the output shaft 70 of the engine 32 which protrudes from the left side of the engine 32. In the present implementation, the output shaft 70 is the crankshaft of the engine 32, but it is contemplated that it could be a separate shaft driven by the crankshaft. The driven pulley 66 is mounted on and drives the input shaft 72 of the transmission 36 which protrudes from the left side of the transmission 36. It is contemplated that the CVT 34 could be mounted on the right side of the engine 32 and of the transmission 36, in which case the shafts 70 and 72 would protrude from the right side of the engine 32 and transmission 36 respectively. The belt 68 is wrapped around the driving and driven pulleys 64, 66 to transfer torque between the driving pulley 64 and the driven pulley 66. As a result, the engine 32 drives the CVT 34 which drives the transmission 36.

The transmission 36 has a plurality of gears and laterally extending shafts (not shown) and a front output shaft (not shown). One of the laterally extending shafts drives a rear differential 74. The rear differential 74 is mounted to the rear of the transmission 36. The rear differential 74 is operatively connected to and drives left and right rear half-shafts 76 via constant velocity joints (not shown) located inside flexible covers (not shown). The laterally outward ends of the rear half-shafts 76 are operatively connected to and drive the rear wheel axles (not shown) via constant velocity joints (not shown) located inside flexible covers (not shown). The rear wheel axles connect to rear wheel hubs (not shown) which in turn drive the rear wheels 18.

Figure 4:
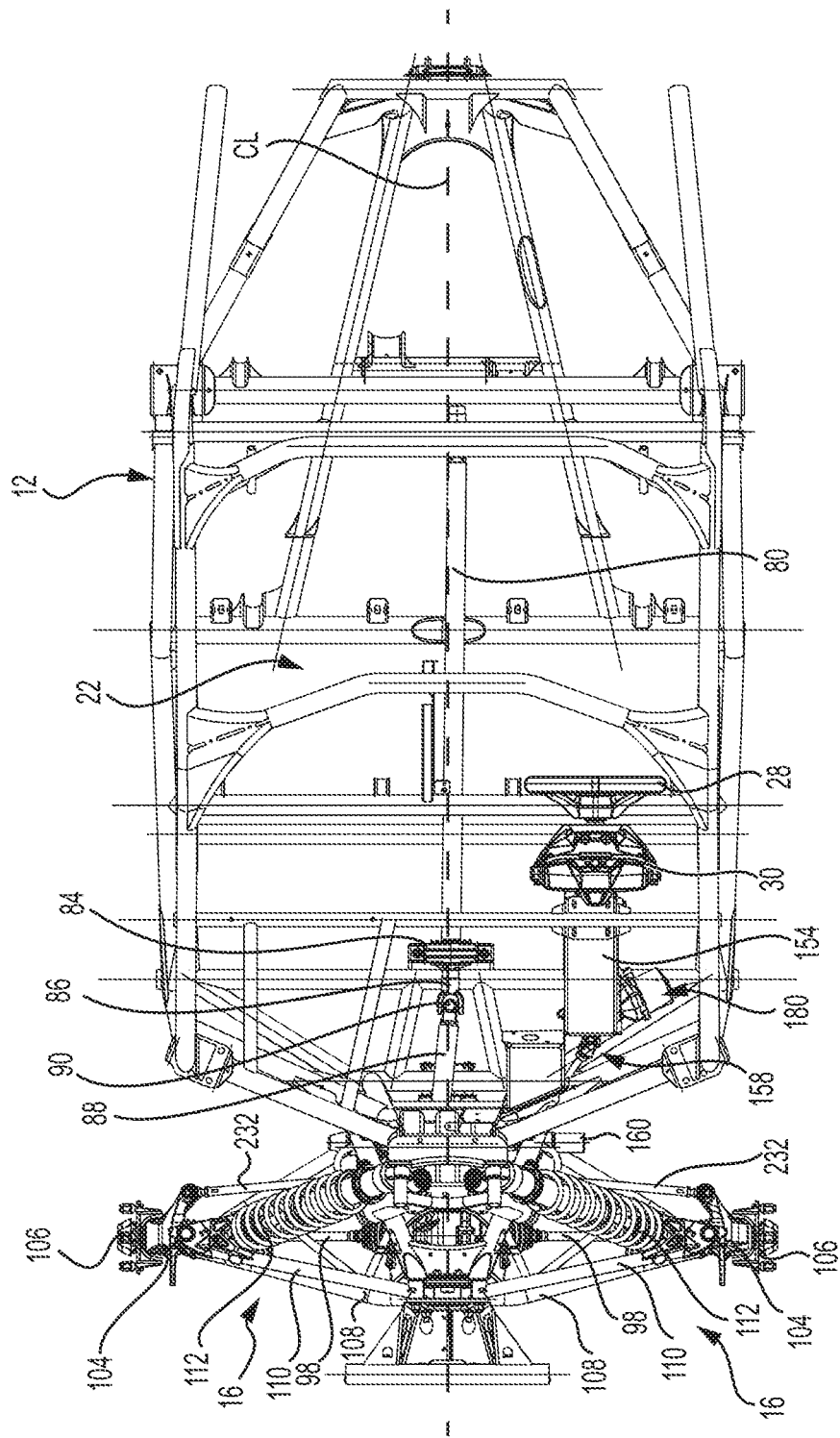
FIG. 4 is a top plan view of the components of FIG. 3.

The front output shaft is operatively connected to and drives a driveshaft 80 via a universal joint (not shown). The front end of the driveshaft 80 is connected to a sleeve 82 supported inside a bearing assembly 84 (FIG. 4). Another driveshaft 86 disposed in front of the bearing assembly and coaxially with the driveshaft 80 is connected via splines to the sleeve 82 in the bearing assembly 84. The front end of the driveshaft 86 is operatively connected to and drives another driveshaft 88 via a universal joint 90. The front end of the driveshaft 88 is operatively connected to and drives a front differential input shaft 92 via a universal joint 94. The front differential input shaft 92 drives a front differential 96.

Figure 9:
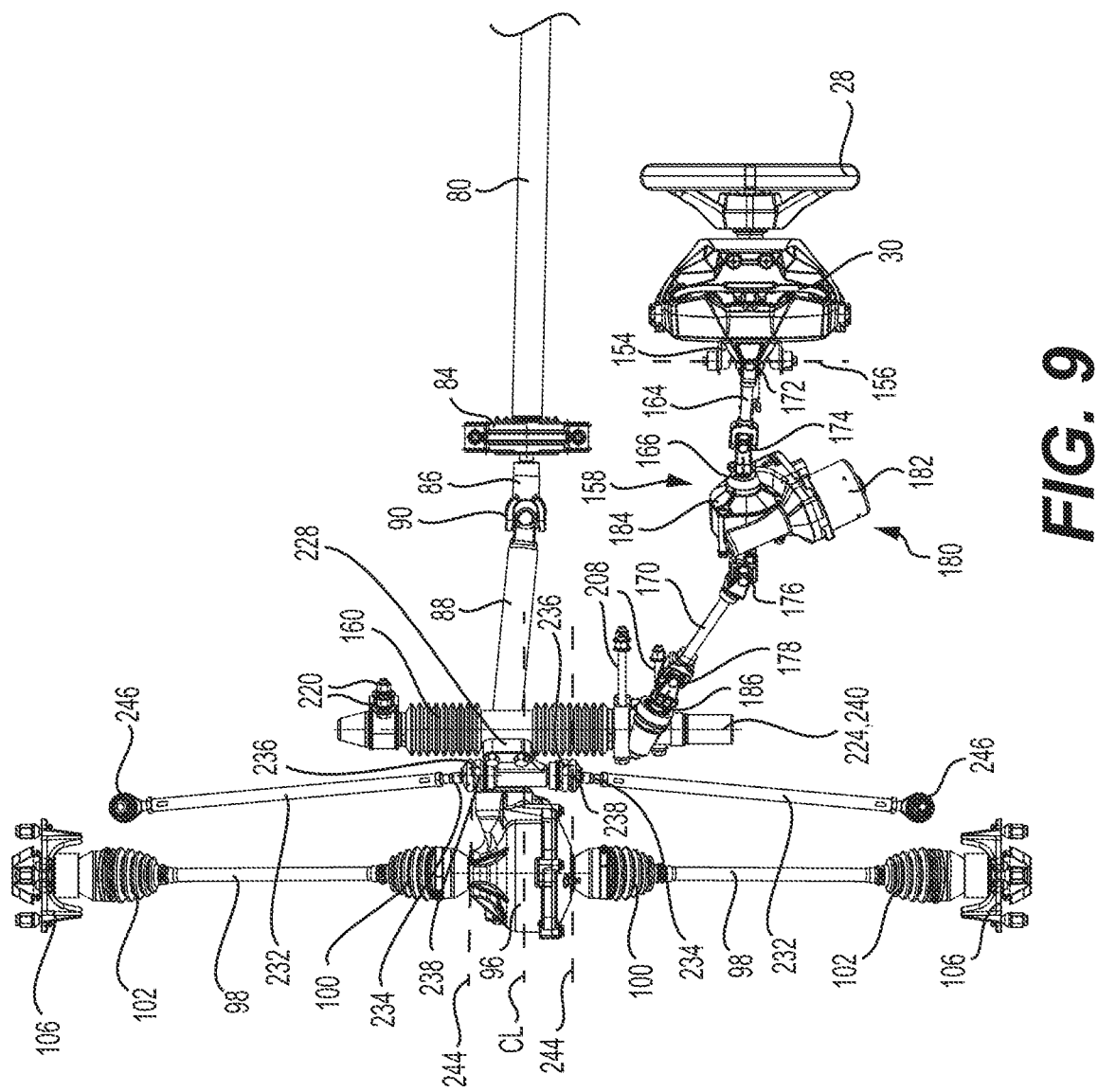
FIG. 9 is a top plan view of the components of FIG. 8.

The driven output gears of the front differential 96 are operatively connected to and drive left and right front half-shafts 98 via constant velocity joints (not shown) located inside flexible covers 100 (FIG. 9). The laterally outward ends of the front half-shafts 98 are operatively connected to and drive the front wheel axles (not shown) via constant velocity joints (not shown) located inside flexible covers 102 (FIG. 9). The front wheel axles extend through the knuckles 104 (FIG. 6) and connect to the front wheel hubs 106 (FIG. 6) which in turn drive the front wheels 14.

Figure 5:
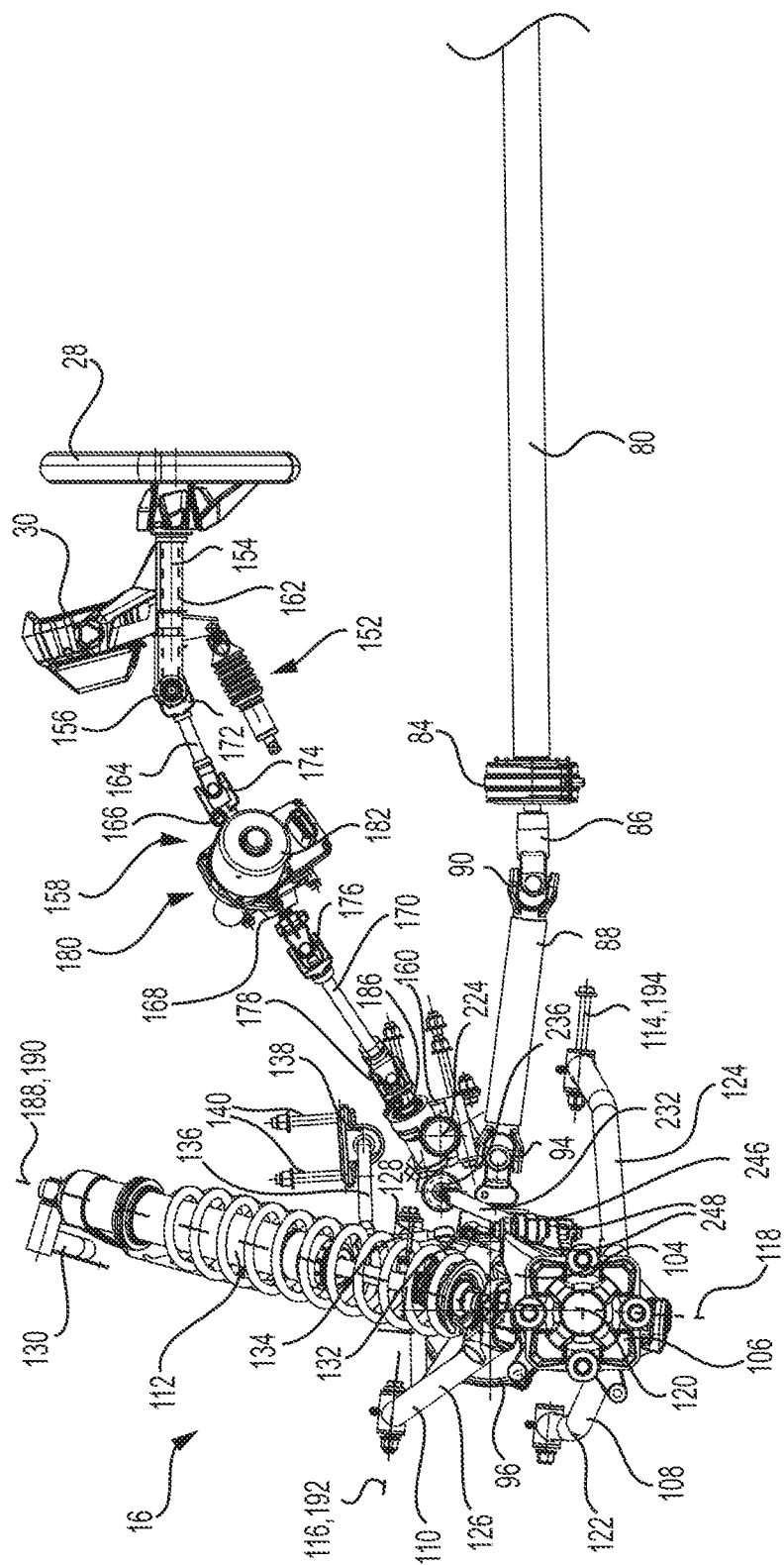
FIG. 5 is a left side elevation view of the front suspension assemblies, steering system and a portion of the power train of the vehicle of FIG. 1.
Figure 6:
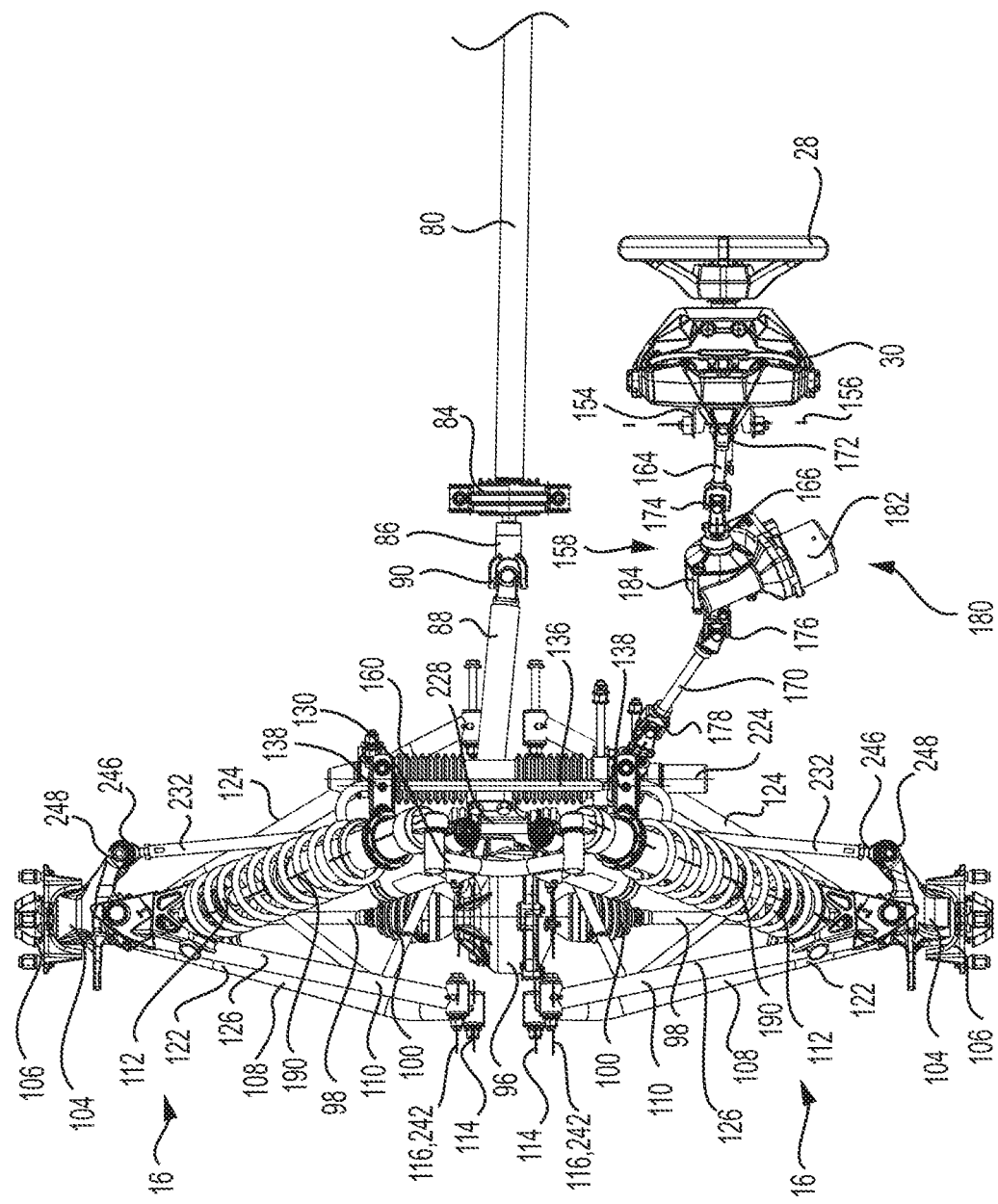
FIG. 6 is a top plan view of the components of FIG. 5.
Figure 7:
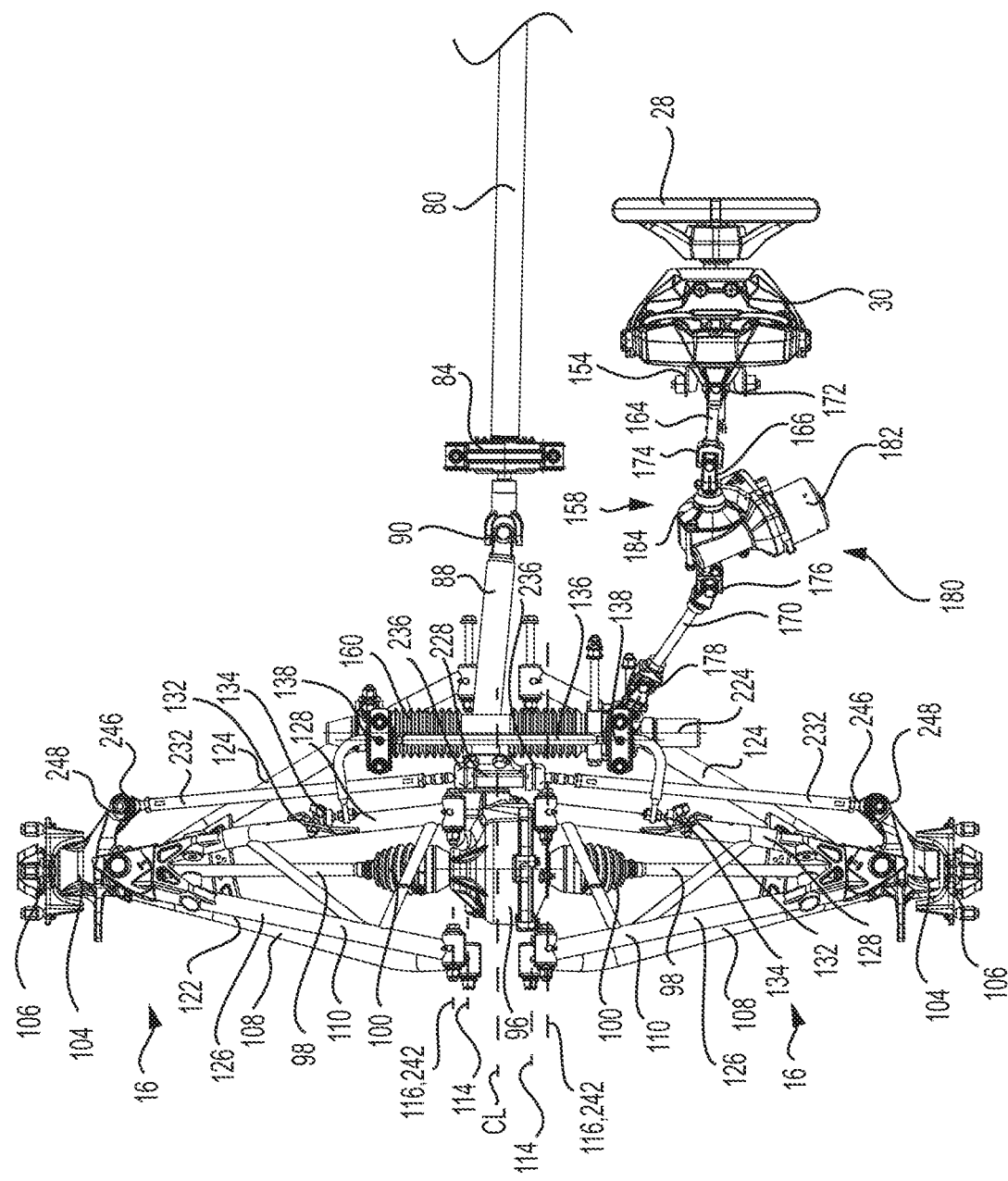
FIG. 7 is a top plan view of the components of FIG. 5 with the shock absorbers removed for clarity.

Turning now to FIGS. 5 to 7, the front suspension assemblies 16 will be described in more detail. As the left and right front suspension assemblies 16 are mirror images of each other, only the left front suspension assembly 16 will described in detail. Components of the right front suspension assembly 16 that correspond to those of the left front suspension assembly 16 have been labeled with the same reference numerals in the figures.

The front suspension assembly 16 is a double A-arm suspension assembly. As such, the front suspension assembly 16 has a lower A-arm 108, an upper A-arm 110 and a shock absorber 112. The shock absorber 112 includes a coil spring disposed around a hydraulic shock, and the hydraulic shock has a separate reservoir connected to it. Since shock absorbers of this type are well known, the shock absorber 112 will not be described in greater detail.

The laterally inward ends of the lower A-arm 108 are pivotally connected to the frame 12 about a lower pivot axis 114. The laterally inward ends of the upper A-arm 110 are pivotally connected to the frame 12 about an upper pivot axis 116. The upper pivot axis 116 of the upper A-arm 110 is parallel to the lower pivot axis 114 of the lower A-arm 108 and both pivot axes 114, 116 extend downward as they extend rearward and extend parallel to a vertical plane passing through the longitudinal centerline CL (FIG. 4) of the vehicle 10. It is contemplated that the pivot axes 114, 116 could not be parallel to each other and/or could not extend parallel to a vertical plane passing through the longitudinal centerline CL. As best seen in FIG. 7, the lower pivot axes 114 of the two lower A-arms 108 are disposed laterally closer to each other than the upper pivot axes 116 of the two upper A-arms 110. The laterally outward ends of the A-arms 108 and 110 are pivotally connected to the bottom and the top of the knuckle 104 respectively. The knuckle 104 pivots relative to the A-arms 108, 110 about an axis 118 (FIG. 5) that is the steering axis of the front wheel 14. The front wheel 14 is connected to the hub 106 that is rotationally connected to the knuckle 104 via a wheel bearing (not shown) such that the wheel 14 can rotate about the wheel rotation axis 120. As best seen in FIG. 5, the lower A-arm 108 has a front arm 122 and a rear arm 124. Similarly, the upper A-arm 110 has a front arm 126 and a rear arm 128. As best seen in FIG. 5, the laterally inward ends of the upper A-arm 110 are disposed closer to each other in the longitudinal direction of the vehicle 10 than the laterally inward ends of the lower A-arm 108.

Figure 3:
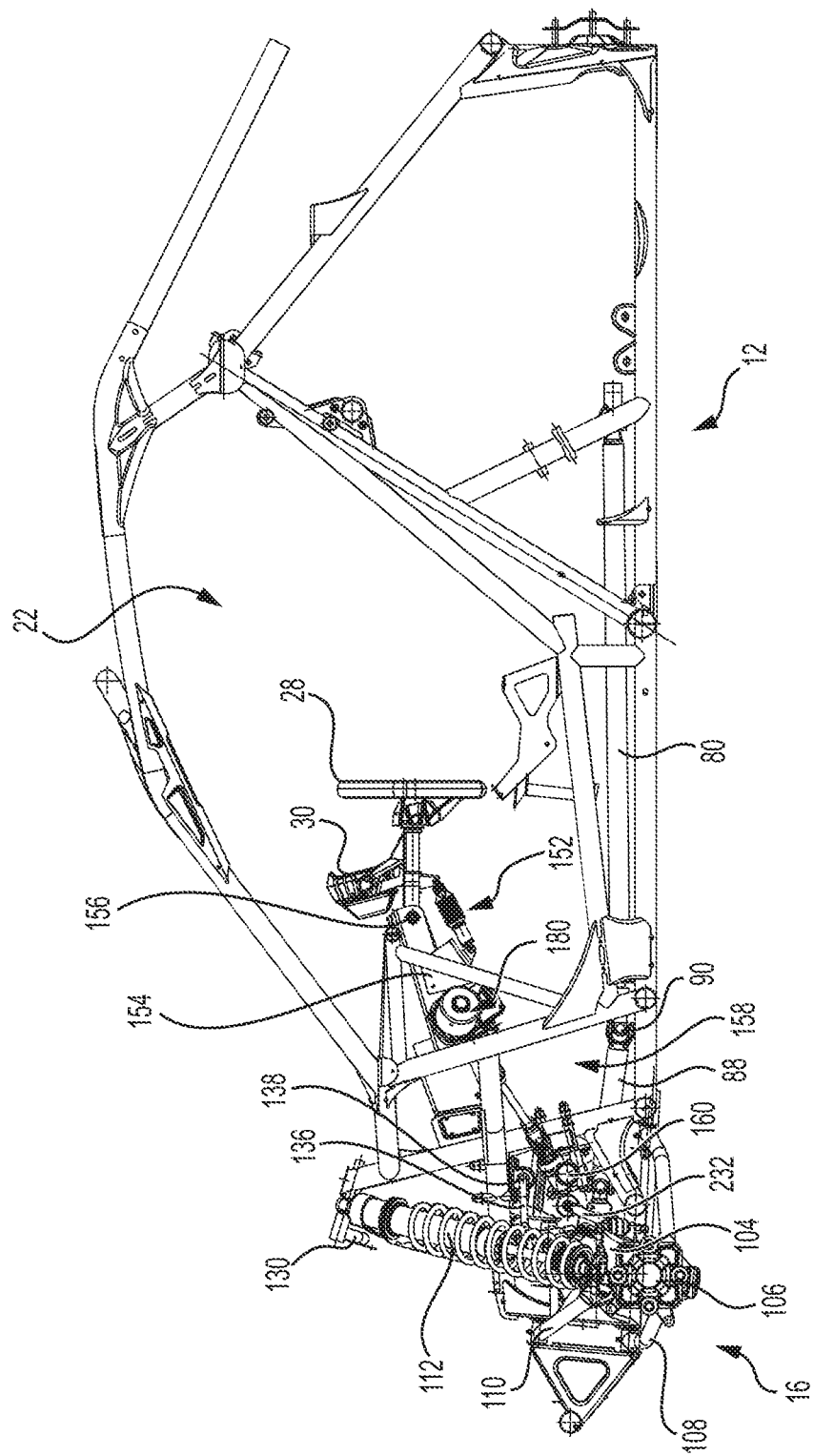
FIG. 3 is a left side elevation view of a frame, front suspension assemblies, steering system and a portion of the power train of the vehicle of FIG. 1.

A shaft (not shown) is connected to the top of the front and rear arms 126, 128 of the upper A-arm 110 near their laterally outward ends. The shaft pivotally connects the lower end of the shock absorber 112 to the upper A-arm 110. It is contemplated that the lower end of the shock absorber 112 could be connected to the lower A-arm 108. From its lower end, the shock absorber 112 extends upward, rearward and laterally inward. The upper end of the shock absorber 112 is pivotally connected to the frame 12. A bent member 130 is disposed in front of the upper ends of the shock absorbers 112 of the left and right suspension assemblies 16 such that the upper ends of the shock absorbers 112 are held between the bent member 130 and the frame 12, as can be seen in FIG. 3. As can be seen in FIG. 1, the upper ends of the shock absorbers 112 extend through the aperture 46 in the cover 44 of the vehicle 10. As a result, the upper ends of the shock absorbers 112 and the bent member 140 are disposed above the cover 44 and are visible from outside the vehicle 10.

Turning back to FIGS. 5 to 7, each upper A-arm 110 has a bracket 132 connected on top of its rear arm 128. Links 134 are connected at their lower ends by ball joints to the brackets 132. The links 134 extend generally vertically and are connected at their upper ends to opposite ends of a sway bar 136 by ball joints. The sway bar 136 is supported by a pair of bushings 138. As can be seen in FIGS. 3 and 5, the bushings 138 are connected to a portion of the frame 12 by bolts 140.

Turning back to FIG. 1, the rear left suspension assembly 20 will be described. The rear right suspension assembly 20 is a mirror image of the rear left suspension assembly 20 and as such will not be described herein. The rear suspension assembly 20 has a trailing arm 142, a shock absorber 144, an upper link 146, a toe link 148 and a lower link 150. The ends of the links 146, 148, 150 have spherical bearings. The trailing arm 142 and the links 146, 148, 150 are connected to a knuckle (not shown). A hub (not shown) is rotationally connected to the knuckle via a wheel bearing (not shown). The rear wheel 18 is connected to the hub such that the wheel 18 can rotate about the wheel rotation axis.

Turning now to FIGS. 5 to 12 the steering assembly of the vehicle 10 will be described. The steering assembly has the steering wheel 28 disposed in front of the driver seat 24. The steering wheel 28 is connected via a steering wheel position adjustment mechanism 152 to the steering wheel support frame structure 154. The steering wheel position adjustment mechanism 152 allows the steering wheel 28 to be pivoted about a laterally extending horizontal axis 156 such that the height of the steering wheel 28 can be adjusted.

The steering wheel 28 is connected by a steering column 158 to a rack and pinion assembly 160. The steering column 158 is made of an assembly of shafts 162, 164, 166, 168, 170 and universal joints 172, 174, 176, 178. It is contemplated that the steering column 158 could be made of more or less shafts and joints than in the present implementation. The steering wheel 28 is connected to the longitudinally extending steering shaft 162 (shown in dotted lines in FIG. 5) that is covered by the steering wheel support frame structure 154. The steering shaft 162 pivots about the axis 156 with the steering wheel 28. The steering shaft 162 is connected by the universal joint 172 to the steering shaft 164. The steering shaft 164 extends downward, forward and rightward from the universal joint 172. The steering shaft 164 is connected by the universal joint 174 to the steering shaft 166. The steering shaft 166 is the input shaft of a power steering unit 180. In the present implementation, the power steering unit 180 includes an electric motor 182 and a gear box assembly 184. The power steering unit 180 applies torque to assist in steering the vehicle 10. The amount of torque applied by the power steering unit 180 varies depending on the operating conditions of the vehicle 10. As such, the steering assembly of the vehicle 10 has what is commonly referred to as a power steering system. The steering shaft 168, which is the output shaft of the power steering unit, is connected by the universal joint 176 to the steering shaft 170. The steering shaft 170 extends downward, forward and rightward from the universal joint 176. The steering shaft 170 is connected by the universal joint 178 to an input shaft 186 of the rack and pinion assembly 160.

Figure 8:
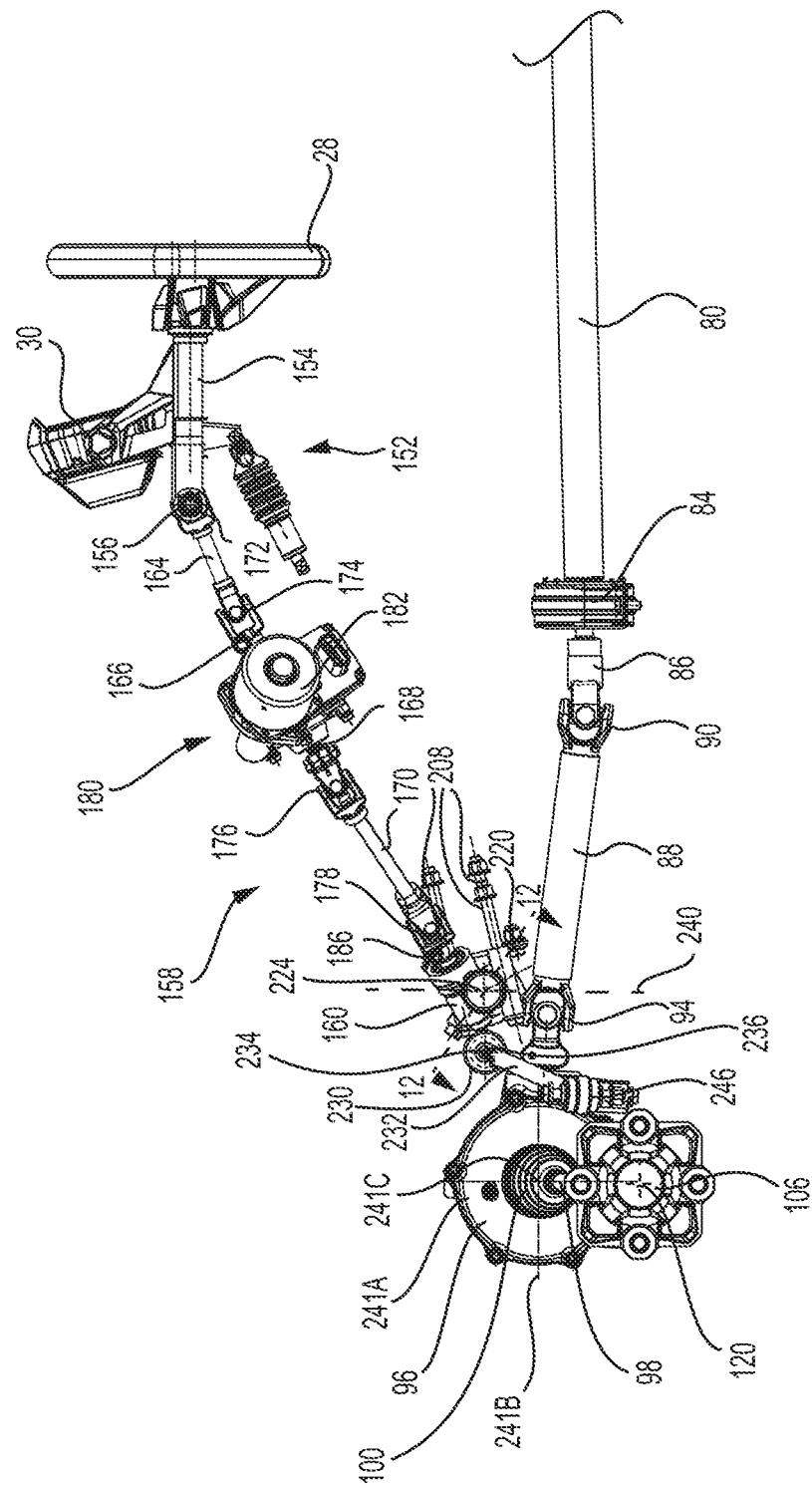
FIG. 8 is a left side elevation view of the steering system and a portion of the power train of the vehicle of FIG. 1.

The rack and pinion assembly 160 is positioned such that the steering column 158 is relatively short. As best seen in FIGS. 8 and 9, the rack and pinion assembly 160 is disposed rearward of the front differential 96 and forward of the power steering unit 180. As best seen in FIGS. 5 and 6, the rack and pinion assembly 160 is disposed rearward of a plane 188 (FIG. 5) containing the shock absorber axes 190 of the shock absorbers 112 and forward of the inner ends of the rear arms 124 of the lower A-arms 108. As best seen in FIGS. 5 to 7, the laterally extending portion of the sway bar 136 extends above the rack and pinion assembly 160. As best seen in FIG. 5, a portion of the rack and pinion assembly 160 is disposed vertically between a top plane 192 containing the upper pivot axes 116 and a lower plane 194 containing the lower pivot axes 114. As best seen in FIGS. 8 and 9, the driveshaft 88 extends under the rack and pinion assembly 160.

Figure 12:
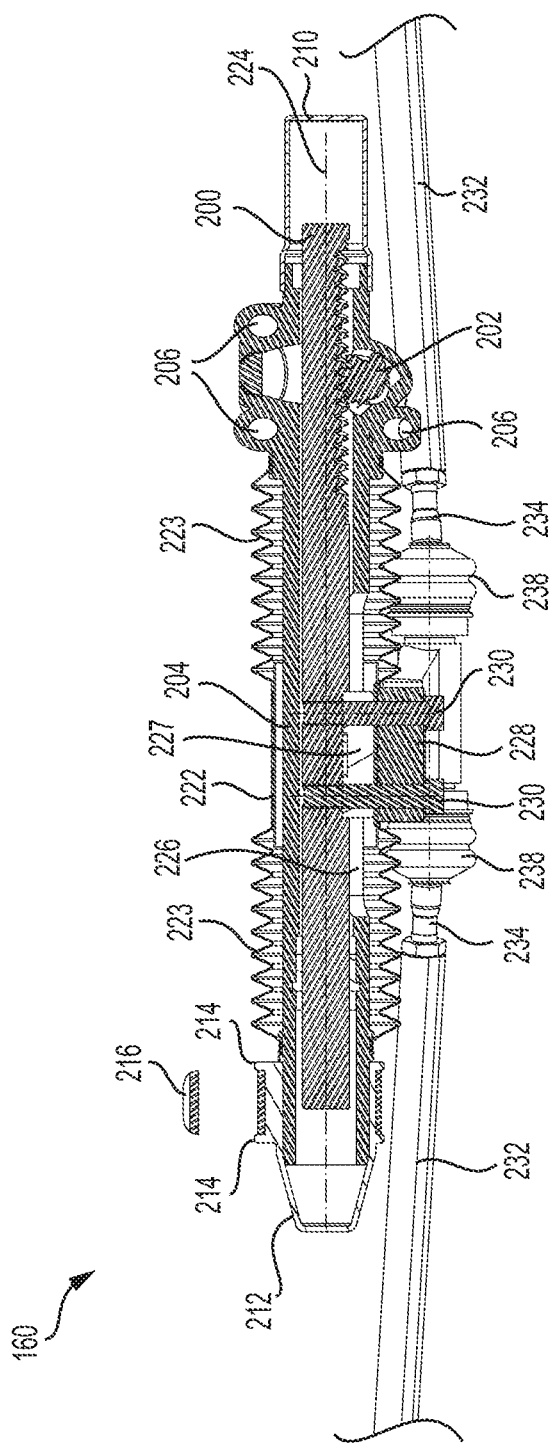
FIG. 12 is a cross-sectional view of the components of FIG. 10 taken through line 12-12 of FIG. 8.

As can be seen in FIGS. 10 to 12, the rack and pinion assembly 160 has a rack 200 having a toothed end engaged by a toothed pinion 202. The rack 200 and the pinion 202 are disposed inside a housing 204. The pinion 202 is connected to the input shaft 186 and is disposed on a left side of the longitudinal centerline CL of the vehicle 10. As such, the universal joint 178 connecting the input shaft 186 to the steering shaft 170 is also disposed on the left side of the longitudinal centerline CL. The portion of the housing 204 near the pinion 202 defines three apertures 206 through which three fasteners 208 (FIGS. 8, 9) are inserted to fasten the rack and pinion assembly 160 to the frame 12. A left cap 210 and a right cap 212 are mounted over the ends of the housing 204. The caps 210, 212 are sufficiently long to accommodate the full translation of the rack 200 left and right. As can be seen, the left end of the left cap 210 and the right end of the right cap 212 are closed and have no apertures therein. The right cap 212 defines flanges 214 between which a U-shaped bracket 216 is received. The U-shaped bracket 216 defines two apertures 218 through which two fasteners 220 (FIGS. 8 and 9) are inserted to fasten the rack and pinion assembly 160 to the frame 12. A cover 222 is disposed around the housing 204 laterally between the right cap 212 and the portion of the housing 204 that houses the pinion 202. The cover 222 has flexible bellows 223 disposed around the housing 204 between the central part of the cover 222 and the right cap 212 and between the central part of the cover 222 and the portion of the housing 204 that houses the pinion 202. The rack 200 has a central lateral axis 224. As can be seen in FIG. 5, the central lateral axis 224 is disposed vertically between the top plane 192 and the bottom plane 194.

As best seen in FIG. 12, the housing 224 defines an aperture 226 in a front thereof. A spacer 227 is disposed in a recess defined in the rack 200 between the rack 200 and the cover 222. A bracket 228 is disposed outside the cover 222. A pair of fasteners 230 is inserted through the bracket 228, the cover 222, the spacer 227 and the rack 200 to fasten the bracket 228 to the rack 200. The bracket 228 provides the connection between the rack 200 and left and right ties rods 232. The inner ends of the tie rods 232 are connected to the bracket 228 and the outer ends of the tie rods 232 are connected to the rear of their respective knuckles 104 rearward of the steering axes 118. The tie rods 232 will be described in greater detail below.

The operation of the steering system in order to make a right turn will now be described. The directions provided in this description are as they would be understood from the point of view of a driver sitting in the driver seat 24. It should be understood that the operation of the steering system in order to make a left turn would have the components of the steering system move in the opposite directions. To make a right turn, the driver turns the steering wheel 28 clockwise. In response, the steering column 158 and the pinion 202 turn clockwise. The rack 200 translates toward the left of the vehicle 10. In response, the left tie rod 232 translates left and pushes the back of the left knuckle 104 toward the left and the right tie rod 232 translates left and pulls the back of the right knuckle 104 toward the left. As a result, the knuckles 104, the wheel hubs 106 and the front wheels 14 pivot about their respective steering axes 118 (clockwise as view from above the vehicle 10) to steer the vehicle 10 to make a right turn.

The tie rods 232 will now be described in more detail. As the left and right tie rods 232 are mirror images of each other, only the left tie rod 232 will be described in detail. Components of the right tie rod 232 that correspond to those of the left tie rod 232 have been labeled with the same reference numerals in the figures.

The right end of the left tie rod 232 consists of a tie rod end 234. The tie rod end 234 is connected to the bracket 228 via a ball joint 236 (shown in dotted lines in FIG. 10). A flexible cover 238 is connected to the bracket 228 and the tie rod end 234 to cover the ball joint 236. As can be seen in FIG. 8, the right end of the tie rod 232 is disposed forwardly of a vertically and laterally extending central plane 240 of the rack 200 and rearward of the front differential 96. The plane 240 contains the central lateral axis 224 of the rack 200. As can also be seen in FIG. 8, the right end of the tie rod 232 is disposed rearward of a vertically and laterally extending central plane 241A of the differential 96 and above of a horizontally and laterally extending central plane 241B of the differential 96. The planes 241A, 241B contain the laterally extending rotation axis 241C of the differential 96. As can be seen in FIG. 5, the right end of the tie rod 232 is disposed rearward of the plane 190 and vertically between the top plane 192 and the bottom plane 194.

When the steering wheel 28 is steered in a position corresponding to the vehicle 10 being steered in a straight ahead direction (i.e. as shown in the figures), the connection between the right end of the left tie rod 232 and the rack 200, via the bracket 228, is disposed laterally between the vertical planes 242 containing the upper pivot axes 116 (FIG. 7) and laterally between vertical planes 244 containing the left and right ends of the front differential 96 (FIGS. 9 and 10). When in this position of the steering wheel 28, the connection between the right end of the left tie rod 232 and the rack 200, via the bracket 228, is disposed laterally between the left vertical plane 242 (FIG. 7) and the longitudinal centerline CL and laterally between the left vertical plane 244 (FIG. 9) and the longitudinal centerline CL. Also when in this position of the steering wheel 28, and with the vehicle 10 at rest on level ground without any cargo or occupants in it (i.e. as shown in the figures), from its right end, the left tie rod 232 extends forward, downward and leftward.

The left end of the left tie rod 232 consists of a tie rod end 246. As best seen in FIGS. 5 to 7, the tie rod end 246 is connected between tabs 248 at the rear of the left knuckle 104 via a ball joint (not shown).

By connecting the inner ends of the tie rods 232 in front the rack and pinion assembly 160 and close to each other, the tie rods 232 are longer than they would have been had a prior art arrangement been used (i.e. with the inner ends of the tie rods connected to the ends of the rack). As a result, for identical front suspension assemblies 16, the longer tie rods 232 of the present technology cause less bump-steer than the tie rods in the prior art arrangement for an equivalent amount of travels of the front suspension assemblies 16 and front wheels 14.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. A vehicle comprising:
a frame;
a motor supported by the frame;
a driveshaft operatively connected to the motor;
a front differential operatively connected to the driveshaft;
a front right half-shaft having a left end operatively connected to the front differential;
a front right wheel operatively connected to a right end of the front right half-shaft;
a front left half-shaft having a right end operatively connected to the front differential;
a front left wheel operatively connected to a left end of the front left half-shaft;
at least one rear wheel supported by the frame;
a steering wheel supported by the frame;
a lower right A-arm being pivotally connected to the frame about a right lower pivot axis;
an upper right A-arm being pivotally connected to the frame about a right upper pivot axis;
a lower left A-arm being pivotally connected to the frame about a left lower pivot axis;
an upper left A-arm being pivotally connected to the frame about a left upper pivot axis;
a steering column operatively connected to the steering wheel;
a rack and pinion assembly operatively connected to the steering column, the rack and pinion assembly being disposed rearward of the front differential;
a right tie rod having a left end operatively connected to a rack of the rack and pinion assembly and a right end operatively connected to the right wheel; and
a left tie rod having a right end operatively connected to the rack and a left end operatively connected to the left wheel,
the left end of the right tie rod and the right end of the left tie rod being disposed forwardly of a vertically and laterally extending central plane of the rack,
when the steering wheel is steered in a position corresponding to the vehicle being steered in a straight ahead position:
a connection of the left end of the right tie rod to the rack and a connection of the right end of the left tie rod to the rack being disposed laterally between the right upper pivot axis and the left upper pivot axis; and
the right lower pivot axis and the left lower pivot axis being disposed laterally between the connection of the left end of the right tie rod to the rack and the connection of the right end of the left tie rod to the rack.

2. The vehicle of claim 1, wherein:
at least a portion of the rack and pinion assembly is disposed vertically between a top plane and a bottom plane;
the top plane contains the right and left upper pivot axes; and
the bottom plane contains the right and left lower pivot axes.

3. The vehicle of claim 1, further comprising a sway bar having a right end operatively connected to the upper right A-arm, a left end operatively connected to the upper left A-arm and a laterally extending central portion; and
wherein the laterally extending central portion of the sway bar extends above the rack and pinion assembly.

4. The vehicle of claim 1, wherein:
the lower right A-arm has a front arm and a rear arm;
the lower left A-arm has a front arm and a rear arm; and
the rack and pinion assembly is disposed forwardly of inner ends of the rear arms of the lower right and left A-arms.

5. The vehicle of claim 1, wherein the driveshaft extends under the rack and pinion assembly.

6. The vehicle of claim 1, wherein a connection between the steering column and a pinion of the rack and pinion assembly is disposed on a left side of a longitudinal centerline of the vehicle.

7. The vehicle of claim 1, wherein:
the lower right A-arm has a front arm and a rear arm;
the lower left A-arm has a front arm and a rear arm;
the upper right A-arm has a front arm and a rear arm;
the upper left A-arm has a front arm and a rear arm; and
inner ends of the rear arms of the lower right and left A-arms are disposed rearward of inner ends of the rear arms of the upper right and left A-arms.

8. The vehicle of claim 1, further comprising:
a right knuckle operatively connected to the right wheel, the right end of the right tie rod being operatively connected to the right knuckle;
the lower right A-arm operatively connecting the right knuckle to the frame;
the upper right A-arm operatively connecting the right knuckle to the frame;
a right shock absorber operatively connected between the frame and one of the lower right A-arm and the upper right A-arm, the right shock absorber being pivotally connected to the frame about a right shock absorber pivot axis;
a left knuckle operatively connected to the left wheel, the left end of the left tie rod being operatively connected to the left knuckle;
the lower left A-arm operatively connecting the left knuckle to the frame;
the upper left A-arm operatively connecting the left knuckle to the frame; and
a left shock absorber operatively connected between the frame and one of the lower left A-arm and the upper left A-arm, the left shock absorber being pivotally connected to the frame about a left shock absorber pivot axis.

9. The vehicle of claim 8, wherein:
the right shock absorber has a right shock absorber axis;
the left shock absorber has a left shock absorber axis; and
the rack and pinion assembly is disposed rearward of a plane containing the right and left shock absorber axes.

10. The vehicle of claim 9, wherein the left end of the right tie rod and the right end of the left tie rod are disposed rearward of the plane containing the right and left shock absorber axes.

11. A vehicle comprising:
a frame;
a motor supported by the frame;
a driveshaft operatively connected to the motor;
a front differential operatively connected to the driveshaft;
a front right half-shaft having a left end operatively connected to the front differential;
a front right wheel operatively connected to a right end of the front right half-shaft;
a front left half-shaft having a right end operatively connected to the front differential;

a front left wheel operatively connected to a left end of the front left half-shaft;

at least one rear wheel supported by the frame;

a steering wheel supported by the frame;

a lower right A-arm being pivotally connected to the frame about a right lower pivot axis;

an upper right A-arm being pivotally connected to the frame about a right upper pivot axis;

a lower left A-arm being pivotally connected to the frame about a left lower pivot axis;

an upper left A-arm being pivotally connected to the frame about a left upper pivot axis;

a steering column operatively connected to the steering wheel;

a rack and pinion assembly operatively connected to the steering column, the rack and pinion assembly being disposed rearward of the front differential;

a right tie rod having a left end operatively connected to a rack of the rack and pinion assembly and a right end operatively connected to the right wheel; and a left tie rod having a right end operatively connected to the rack and a left end operatively connected to the left wheel, the left end of the right tie rod and the right end of the left tie rod being disposed forwardly of a vertically and laterally extending central plane of the rack, the right lower pivot axis and the left lower pivot axis being disposed laterally between a right vertical plane and a left vertical plane, the right vertical plane containing a right end of the front differential, the left vertical plane containing a left end of the front differential, the right lower pivot axis and the left lower pivot axis being disposed laterally between the right upper pivot axis and the left upper pivot axis.

12. The vehicle of claim 11, wherein:

at least a portion of the rack and pinion assembly is disposed vertically between a top plane and a bottom plane;

the top plane contains the right and left upper pivot axes; and the bottom plane contains the right and left lower pivot axes.

13. The vehicle of claim 11, further comprising a sway bar having a right end operatively connected to the upper right A-arm, a left end operatively connected to the upper left A-arm and a laterally extending central portion; and wherein the laterally extending central portion of the sway bar extends above the rack and pinion assembly.

14. The vehicle of claim 11, wherein:

the lower right A-arm has a front arm and a rear arm;

the lower left A-arm has a front arm and a rear arm; and the rack and pinion assembly is disposed forwardly of inner ends of the rear arms of the lower right and left A-arms.

15. The vehicle of claim 11, wherein the driveshaft extends under the rack and pinion assembly.

16. The vehicle of claim 11, wherein a connection between the steering column and a pinion of the rack and pinion assembly is disposed on a left side of a longitudinal centerline of the vehicle.

17. The vehicle of claim 11, wherein:

the lower right A-arm has a front arm and a rear arm;

the lower left A-arm has a front arm and a rear arm;

the upper right A-arm has a front arm and a rear arm;

the upper left A-arm has a front arm and a rear arm; and inner ends of the rear arms of the lower right and left A-arms are disposed rearward of inner ends of the rear arms of the upper right and left A-arms.

18. The vehicle of claim 11, further comprising:

a right knuckle operatively connected to the right wheel, the right end of the right tie rod being operatively connected to the right knuckle;

the lower right A-arm operatively connecting the right knuckle to the frame;

the upper right A-arm operatively connecting the right knuckle to the frame;

a right shock absorber operatively connected between the frame and one of the lower right A-arm and the upper right A-arm, the right shock absorber being pivotally connected to the frame about a right shock absorber pivot axis;

a left knuckle operatively connected to the left wheel, the left end of the left tie rod being operatively connected to the left knuckle;

the lower left A-arm operatively connecting the left knuckle to the frame;

the upper left A-arm operatively connecting the left knuckle to the frame; and a left shock absorber operatively connected between the frame and one of the lower left A-arm and the upper left A-arm, the left shock absorber being pivotally connected to the frame about a left shock absorber pivot axis.

19. The vehicle of claim 18, wherein:

the right shock absorber has a right shock absorber axis;

the left shock absorber has a left shock absorber axis; and the rack and pinion assembly is disposed rearward of a plane containing the right and left shock absorber axes.

20. The vehicle of claim 19, wherein the left end of the right tie rod and the right end of the left tie rod are disposed rearward of the plane containing the right and left shock absorber axes.

* * * * *